(12) United States Patent
Bose et al.

(10) Patent No.: US 12,545,828 B1
(45) Date of Patent: Feb. 10, 2026

(54) BIOPOLYMER SHALE INHIBITORS AND METHODS OF MAKING AND USING SAME

(71) Applicant: Halliburton Energy Services, Inc., Houston, TX (US)

(72) Inventors: Sohini Bose, Houston, TX (US); Jay Deville, Houston, TX (US); William W. Shumway, Houston, TX (US); Preston Andrew May, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/828,877

(22) Filed: Sep. 9, 2024

(51) Int. Cl.
| | |
|---|---|
| C09K 8/035 | (2006.01) |
| C09K 8/514 | (2006.01) |
| C09K 8/528 | (2006.01) |
| E21B 21/00 | (2006.01) |

(52) U.S. Cl.
CPC .............. C09K 8/528 (2013.01); C09K 8/035 (2013.01); C09K 8/514 (2013.01); E21B 21/00 (2013.01); C09K 2208/12 (2013.01)

(58) Field of Classification Search
None
See application file for complete search history.

(56) References Cited

U.S. PATENT DOCUMENTS

| | | | | |
|---|---|---|---|---|
| 4,299,710 | A * | 11/1981 | Dupre | C08L 35/00 507/119 |
| 9,969,921 | B2 | 5/2018 | Wang et al. | |
| 11,066,590 | B2 | 7/2021 | May | |
| 2008/0318812 | A1* | 12/2008 | Kakadjian, Sr. | C09K 8/64 507/221 |
| 2009/0099046 | A1* | 4/2009 | Procter | C09K 8/524 507/131 |
| 2017/0218261 | A1 | 8/2017 | Nguyen | |
| 2017/0253790 | A1 | 9/2017 | Sparks et al. | |
| 2017/0362486 | A1* | 12/2017 | Santos | C09K 8/90 |
| 2018/0156019 | A1 | 6/2018 | Nguyen et al. | |
| 2019/0039950 | A1 | 2/2019 | May et al. | |
| 2024/0229606 | A1 | 7/2024 | Khramov et al. | |

FOREIGN PATENT DOCUMENTS

| | | |
|---|---|---|
| AR | 035441 A1 | 5/2004 |
| RU | 2633468 C1 | 10/2017 |
| WO | 2015009612 A1 | 1/2015 |
| WO | 2016131762 A1 | 8/2016 |

OTHER PUBLICATIONS

Halliburton, BARACOR® 95, Safety Data Sheet according to Regulation (EC) No. 453/2010. Revision 41, Sep. 15, 2015. 9 pages.
(Continued)

*Primary Examiner* — Andrew Sue-Ako
(74) *Attorney, Agent, or Firm* — Conley Rose, P.C.; Rodney B. Carroll

(57) ABSTRACT

A method includes contacting subterranean shale with a treatment fluid, wherein the treatment fluid comprises (i) a biopolymer, (ii) a polyamine, and (iii) an aqueous base fluid, and compositions relating thereof.

21 Claims, 3 Drawing Sheets

(56) References Cited

OTHER PUBLICATIONS

Halliburton, BaraSure™ W-674, Safety Data Sheet. Revision 16, Jan. 24, 2024. 15 pages.
Fann, Barasure W-967™ 2% w/w Standard Solution, Safety Data Sheet acc. to OSHA HCS, May 13, 2021. 8 pages.
Aqua Solutions, BaraSure TM W-988, Safety Data Sheet acc. to OSHA HCS, Sep. 16, 2020. 7 pages.
Halliburton, BaraSureTM W-988 Shale Inhibitor Improves Hole Stability in Deepwater Well, Saving up to 10 Days of Rig Time, H014376 11/2© 2022. 2 pages.
Halliburton, CLAYSEAL® Plus, Safety Data Sheet, Revision No. 22, Oct. 8, 2015. 9 pages.
Shinetsu, SE Tylose GmbH & Co. KG, Test method No. 1300 Viscosity determination by the Brookfield LV viscometer at 25° C., version 7. 2 pages.
Foreign Communication from Related Application—International Search Report and Written Opinion of the International Searching Authority, International Application No. PCT/US2025/033472, dated Oct. 16, 2025, 9 pages.

\* cited by examiner

BIOPOLYMER SHALE INHIBITORS AND METHODS OF MAKING AND USING SAME

TECHNICAL FIELD

Embodiments of the disclosure are directed to biopolymer shale inhibitors and methods of making and using same. The methods include contacting subterranean shale with a treatment fluid comprising (i) a biopolymer, (ii) a polyamine, and (iii) an aqueous base fluid.

BACKGROUND

During drilling of subterranean wellbores, various strata that include reactive shales may be encountered. Examples of these shales include certain types of clays (for example, bentonite). Reactive shales may be problematic during drilling operations because of, inter alia, their tendency to degrade when exposed to aqueous media, such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the wellbore until such time as the cuttings can be removed by solids control equipment located at the surface.

Shale disintegration also may impact "equivalent circulating density" ("ECD"). ECD may be affected by the solids content of the drilling fluid, which may increase if surface solids control equipment cannot remove shale from the drilling fluid. Plastic viscosity (an indicator of size and quantity of solids) is an important parameter that affects drilling rate. Maintenance of appropriate ECD is a factor in drilling a wellbore where a narrow tolerance exists between the weight of the drilling fluid to control the formation pressure and the weight of the drilling fluid that can fracture the formation. In such circumstances, minimizing shale degradation may be desirable, inter alia, to control of the viscosity of the drilling fluid. Moreover, degradation of drilled cuttings prior to their removal at the surface may prolong drilling time. Sometimes shale particles traveling up the wellbore can degrade into smaller and smaller particles, which can expose new surface area of the shale particles to the drilling fluid and lead to further absorption of water and degradation, and permit passage of degraded particles through strainers intended for their removal.

Shale degradation may substantially decrease the stability of the wellbore, which may cause irregularities in the diameter of the wellbore, e.g., the diameter of some portions of the wellbore may be either smaller or greater than desired. In an extreme case, shale degradation may decrease the stability of the wellbore to such an extent that the wellbore collapses. Degradation of the shale may also interrupt circulation of the drilling fluid, increase friction between the drill string and the wellbore, and/or cause the drill string to stick in the wellbore. Accordingly, the complications associated with shale swelling during drilling may substantially increase the time and cost of drilling.

Shale inhibitors and/or stabilizers are often used in drilling operations as they reduce the swelling of sensitive formation and water uptake. Existing polyglycols, amphoteric materials (i.e., substances that may exhibit both acidic and/or alkaline properties), inorganic salt-based materials (e.g., potassium chloride), and acrylamide-based synthetic shale stabilizers can be effective, but may be disfavored in environmentally sensitive applications. When drilling fluids are disposed after drilling operations, they can be discarded with the drill cuttings and additives. Therefore, there is a demand for additives that are an environmentally friendly, and give an equivalent or better performance. Thus, there is a need to identify additional additives that are environmentally friendly, biodegradable, and sustainable, while also maintaining efficient drilling fluid properties.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
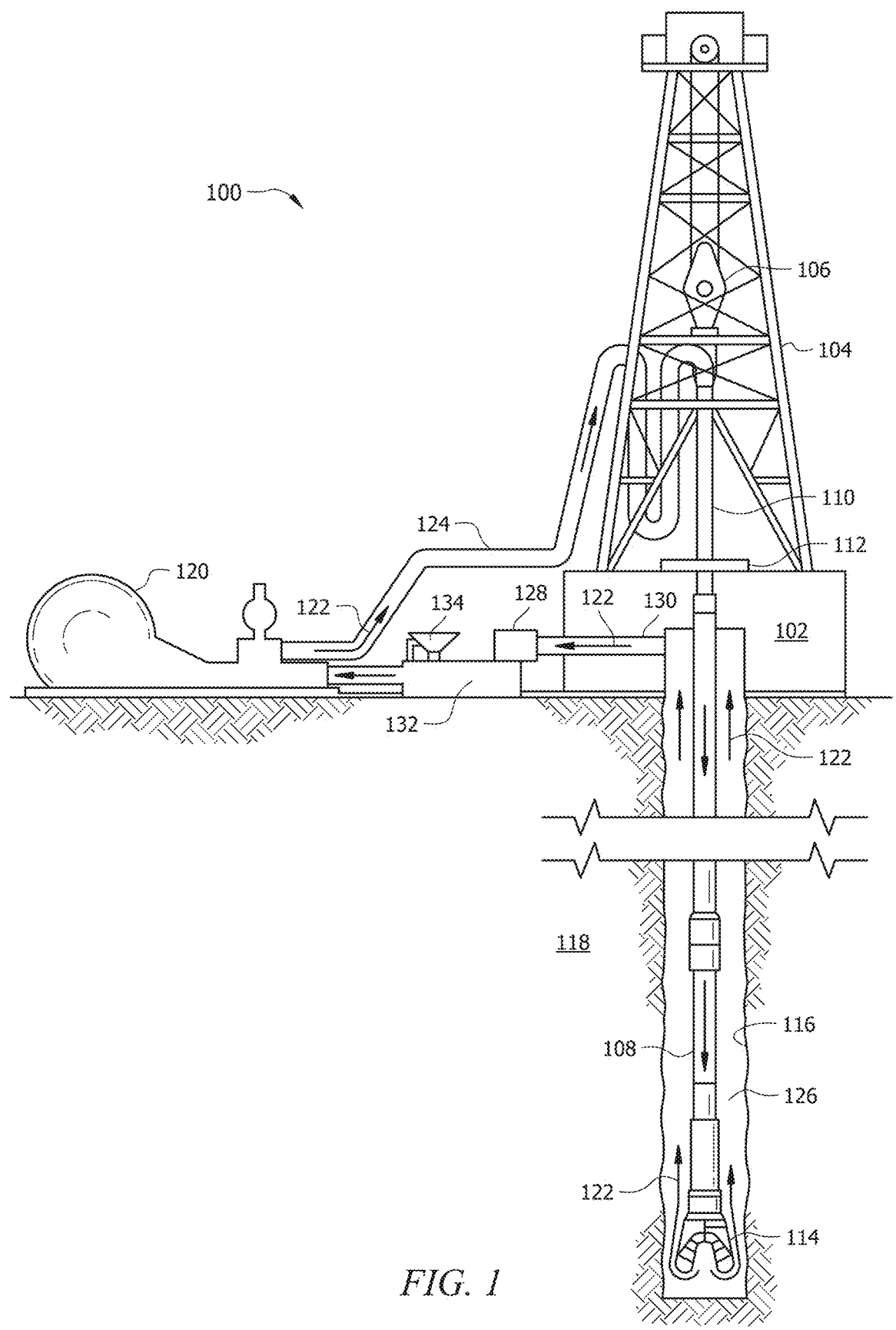
FIG. 1 is a schematic diagram of an exemplary drilling assembly in accordance with some embodiments of the disclosure.

In the following detailed description of the illustrative embodiments, reference is made to the accompanying drawings that form a part hereof. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims. Substantially similar or identical elements in the drawings may be identified by the same numeral to reduce redundancy.

As used herein, the term "shale" is defined to mean materials that may "swell," or increase in volume, when exposed to water.

As used herein, the term "fluid path" can be a path formed by a wellbore and can be used for the production of fluids, such as hydrocarbons and water, or be used for the injection of fluids, such as water, carbon dioxide, and natural gas, e.g., methane.

As used herein, the term "base fluid" or "bulk fluid" refers to the major component of a fluid, (e.g., equal to or greater than about 50, about 55, about 60, about 65, about 70, about 75, about 80, about 85, or about 90 weight percent based on the total weight of the fluid, as opposed to components dissolved and/or suspended therein), and does not indicate any particular condition or property of that fluid such as its mass, amount, pH, or other properties.

As used herein, the term "substantially constant" such as a substantially constant amount, can mean within about 10%, about 5%, or even about 1% of the referenced item, such as within about 10%, about 5%, or even about 1%, by weight, of an amount.

As used herein, the term "coupled" can mean two items, directly or indirectly, joined, fastened, associated, connected, communicated, or formed integrally together either by chemical or mechanical means, by processes including extruding, stamping, molding, or welding. What is more, two items can be coupled by the use of a third component such as a mechanical fastener, e.g., a screw, a nail, a staple, or a rivet; an adhesive; or a solder.

As used herein, the term "derived" can mean a process for preparing a substance for use as a treatment fluid component by subjecting to one or more processes, such as blending, and in some embodiments, may optionally include separating and/or purifying, such as a polyamine, e.g., a hexamethylene diamine (HMD), from the starting material.

As used herein, the phrase "inhibit shale", or variants thereof, refers to the action of one or more different mechanisms, either individually or collectively, to at least partially stabilize shale particles, and/or to prevent their swelling, attrition and/or abrasion into smaller particles by, in some embodiments, by forming a film.

As used herein, the term "encapsulation" and variants thereof do not imply any particular degree of encapsulation or coating, whether partial or otherwise, and in some embodiments, includes coating one or more particles of shale.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling operations, completion operations, cementing operations, fracturing operations, gravel packing operations, acidizing operations, scale dissolution and removal, consolidation operations, and the like. For example, a fluid may be used to drill a wellbore in a subterranean formation or to complete a wellbore in a subterranean formation, as well as numerous other purposes.

As used herein, a drilling fluid, or "mud", which may be a drilling fluid, can also be called a treatment fluid circulated in a wellbore as the wellbore is being drilled to facilitate the drilling operation. The various functions of a drilling fluid can include removing drill cuttings from the wellbore, cooling and lubricating the drill bit, aiding in support of the drill pipe and drill bit, and providing a hydrostatic head to maintain the integrity of the wellbore walls and prevent well blowouts.

As used herein, the term "and/or" can mean one or more of items in any combination in a list, such as "A and/or B" means "A, B, or the combination of A and B".

The present disclosure relates to compositions, such as treatment fluids and methods for making treatment fluids, and drilling and/or treating subterranean formations that include shale. More particularly, the present disclosure relates to shale inhibitors including a biopolymer and a polyamine combined with an aqueous base fluid to form a treatment fluid.

The treatment fluids (e.g., drilling fluids) used in the methods and systems of the present disclosure may include any aqueous base fluid known in the art, including aqueous base fluids, non-aqueous base fluids, and any combinations thereof.

Without limitation, a biopolymer is a type of polymer that is produced by a living organism. In some embodiments, any suitable biopolymer may be included, such as a xanthan gum, a rhamnan, a scleroglucan, a welan gum, a diutan gum, a guar gum, a gelan gum, a cellulose or any combination thereof. In certain embodiments, the biopolymer may include the cellulose, particularly a hydroxyethyl cellulose or a carboxymethyl cellulose, or even a hydroxyethyl cellulose (HEC). In an aspect, the biopolymer, such as those described herein, can be water-soluble polymers.

The water-soluble polymers of the present disclosure may include any water-soluble polymers with acceptable biodegradation and/or aquatic toxicity levels. In some embodiments, such polymers are both water soluble and water dispersible. Generally, these water-soluble polymers would be materials that uniformly dissolve in aqueous media including salt solutions as well as fresh water. Typically, polymers that are water soluble or water dispersible are water wet and form hydrogen bonding interactions with water. These polymers can include cross-linked polymers where the core of the polymer remains insoluble, but the materials are completely water dispersible. In some aspects, an approximate measure of water solubility and/or dispersibility is the polymer product does not float nor sink to a bottom of an aqueous fluid upon mixing. In some embodiments, a range of solubility is generally in a range of greater than zero and equal to about 10%, about 1-10%, about 2-10%, about 3-10%, about 4-10%, about 5-10%, about 6-10%, about 7-10%, about 8-10%, about 9-10%, or about 5, 6, 7, 8, 9 or 10%, by weight of polymer in fresh water.

In certain embodiments, the water-soluble polymers of the present disclosure may include environmentally-friendly polymers that are on the "OSPAR List of Substances/Preparations Used and Discharged Offshore Which Are Considered to Pose Little or No Risk to the Environment" (hereinafter "PLONOR list") (available through the following website: https://www.ospar.org/work-areas/oic/chemicals) and/or pass one or more Organization of Economic Cooperation and Development (OECD) biodegradation tests (e.g., OECD 301C-F, 306, and 310). In certain embodiments, the water-soluble polymers of the present disclosure may be selected from the group consisting of cellulose derivatives (e.g., hydroxyethyl cellulose, carboxymethyl cellulose, carboxymethyl hydroxyethyl cellulose), guar, and guar derivatives (e.g., hydroxypropyl guar, carboxymethyl hydroxypropyl guar), and any combination thereof. In certain embodiments, the water-soluble polymers may be provided in liquid or dry form when added to the treatment fluid.

The hydroxy cellulose can vary in molecular weight, from low molecular weight to high molecular weight. The molecular weight of hydroxy cellulose can be represented by its viscosity. Some exemplary hydroxy cellulose with increasing molecular weight is depicted in the table below:

TABLE 1

Brookfield rotation viscometer, model LV

| Products | Viscosity | Concentration to be measured |
|---|---|---|
| 1 | 6,000 centipoise (cP) | 2% dry basis |
| 2 | 30,000 cP | 1% dry basis |
| 3 | 60,000 cP | 1% dry basis |
| 4 | 100,000 cP | 1% dry basis |

The hydroxyethyl cellulose can have a degree of substitution of ethylene oxide from about 0.1 to about 3, or about 1 to about 3. In some embodiments, the degree of substitution refers to the average number of hydroxyl groups per monosaccharide substituted with ethylene oxide. In certain embodiments, molar substitution of HEC can range from about 1 to about 30, refer to the average number of moles of ethylene oxide per monosaccharide unit, and range from 0 to theoretically infinity.

In certain embodiments, the water-soluble polymers of the present disclosure may be capable of imparting a viscosity of about 2 centipoise (cP) or greater, even about 5.5 cP or greater, to 8.6 pounds per gallon (ppg) potassium chloride (KCl) brine at room temperature when 0.5 pound per barrel (lb/bbl) of the water-soluble polymer is dissolved in the brine, as measured on a FANN® viscometer at 300 rpm. It is believed, although not wanting to be bound by theory, that the capability of a water-soluble polymer to impart the above-mentioned viscosity correlates with the molecular weight of the water-soluble polymer.

The treatment fluid can include a polyamine. In some embodiments, the polyamine can include a molecule with two or amine groups, such as a diamine, a triamine, a tetraamine, or a combination thereof. In some instances, the diamine can include hexamethylene diamine (HMD) or a derivative of HMD, such as ethoxylated HMD, carboxymethylated HMD, and propoxylated HMD. Sometimes, the hexamethylene diamine is protonated. One suitable hexadiamine is commercially available as a mixture of a reaction mass of 7-azatridecane-1,13-diamine and hexamethylenediamine in an amount of about 10% to about 30%, hydrochloric acid in an amount of about 10% to about 30%, hexamethylenediamine in an amount of about 10% to about 30%, and 1,2-cyclohexanediamine in an amount of about 5% to about 10%. The amine can be optionally protonated to alter its charge and optionally its solubility and reactivity.

The treatment fluids (e.g., drilling fluids) used in the methods and systems may include any aqueous base fluid known in the art, including aqueous base fluids, non-aqueous base fluids, and any combinations thereof. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In certain embodiments, the treatment fluids may include a mixture of one or more aqueous fluids with other fluids and/or gases, including but not limited to emulsions, foams, and the like.

The shale inhibiting additives including a water-soluble polymer may be provided in a treatment fluid in any suitable amount. In certain embodiments, the shale inhibiting additive may consist of one or more water-soluble polymers. In some embodiments, the shale inhibiting additive may be included in the treatment fluid in an amount from about 0.1 lb/bbl to about 10 lb/bbl. In some embodiments, the shale inhibiting additives may be included in the treatment fluid in an amount from about 0.2 lb/bbl to about 5 lb/bbl. Sometimes, the shale inhibiting additives may be included in the treatment fluid in an amount from about 0.5 lb/bbl to about 5 lb/bbl. In certain embodiments, the shale inhibiting additives may be included in the treatment fluid in an amount from about 0.5 lb/bbl to about 1.5 lb/bbl. A person of skill in the art with the benefit of this disclosure will recognize suitable amounts of the shale inhibiting additive to include in a treatment fluid of the present disclosure based on, among other things, the amount and/or reactivity of shale in the formation, other components of the treatment fluid (e.g., brines), the desired viscosity of the treatment fluid, and other parameters of the operation in which the treatment fluid can be used. In certain embodiments, the treatment fluid does not include any polymer-based shale inhibiting additives and/or other shale inhibiting additives that are not environmentally-friendly (e.g., that are not included on the PLONOR list).

In some embodiments, the treatment fluid is formulated as a drilling fluid. The drilling fluid can further include a modified starch, a viscosifier, a penetration rate enhancer, a spotting fluid, a sweeping agent, a deflocculant, a degreaser, a wetting agent, another shale inhibitor, a friction reducer, a strength-stabilizing agent, an emulsifier, an expansion agent, a salt, a vitrified shale, a thixotropic agent, a dispersing agent, a weight reducing additive, a heavyweight additive, a surfactant, a scale inhibitor, a clay stabilizer, a silicate-control agent, a biocide, a biostatic agent, a storage stabilizer, a filtration control additive, a suspending agent, a foaming surfactant, one or more latex emulsions, a formation conditioning agent, one or more elastomers, at least one of a gas and fluid absorbing material, one or more resins, one or more superabsorbers, one or more mechanical property modifying additives, one or more inert particulates, a biopolymer, a polymer, a fumed silica, a fluid control additive, one or more particulate materials, one or more corrosion inhibitors, one or more relative permeability modifiers, a lime, one or more clay control agents, one or more fluid loss control additives, one or more flocculants, one or more water softeners, one or more foaming agents, one or more oxidation inhibitors, one or more thinners, one or more scavengers, one or more gas scavengers, one or more lubricants, one or more bridging agents, a foam stabilizer, one or more catalysts, one or more dispersants, an emulsion thinner, an emulsion thickener, a pH control additive, one or more lost circulation additives, one or more buffers, one or more stabilizers, one or more chelating agents, one or more oxidizers, a clay, one or more reducers, a consolidating agent, a complexing agent, a sequestration agent, a control agent, or a combination thereof. The modified starch can include a polysaccharide and a bridging agent including a calcium carbonate, a magnesium carbonate, a magnesium oxide, a manganese tetroxide, an ilmenite, or a combination thereof.

In some embodiments, the treatment fluids may contain one or more salts, inter alia, to provide the desired density to the treatment fluid. One of ordinary skill in the art, with the benefit of this disclosure, will recognize the need for caution when combining a salt with a treatment fluid for use in certain regions of the world where such use of a salt may be subject to environmental restrictions. One of ordinary skill in the art will also recognize where it is desirable to use a dense brine rather than, among other things, a solid weighting agent. Where the use of a salt is permissible, a variety of salts may be used. Examples of suitable salts include, but are not limited to, potassium chloride, sodium chloride, potassium formate, potassium carbonate, calcium chloride, calcium bromide, zinc chloride, zinc bromide, calcium nitrate, cesium formate, sodium formate, or a combination thereof. In certain embodiments, a mixture of suitable salts may be used. In certain embodiments, the salts may be present in the treatment fluids in an amount in the range of from about 5 pounds per barrel (about 14 kilogram per meter cubed ($kg/m^3$)) to about the salt saturation limit of the treatment fluid.

In some embodiments, the treatment fluids used in the methods and systems optionally may include one or more weighting agents, among other purposes, to provide a treatment fluid of the desired weight and/or density for the subterranean formation in which it is used. Examples of weighting agents that may be suitable in certain embodiments include but are not limited to, barites (barium sulfate), hematite, iron ores, siderite, ilmenite, galena, carbonates (e.g., calcium carbonate, magnesium carbonate, iron carbonate, zinc carbonate), manganese tetraoxide, chloride salts (e.g., NaCl, KCl, $CaCl_2$), bromide salts (e.g., NaBr, $CaBr_2$) formate salts, and any combination thereof. These weighting agents may be at least partially soluble or insoluble in the treatment fluid. The weighting agents may be included in a treatment fluid in any amount needed to impart the desired properties to the fluid. In some embodiments, a weighting agent may be present in the treatment fluids in an amount of from about 1% to about 60% by weight of the treatment fluid (e.g., about 5%, about 10%, about 15%, about 20%, about 25%, about 30%, about 35%, about 40%, about 45%, about 50%, about 55%, by weight, etc.). In some embodiments, the weighting agents may be present in the treatment fluids in an amount of from about 1% to about 35% by weight of the treatment fluid. In some embodiments, the weighting agent may be present in the treatment fluids in an amount of from about 1% to about 10% by weight of the treatment fluid.

In some embodiments, the treatment fluids used in the methods and systems optionally may include any number of additional additives. Examples of such additional additives include, but are not limited to, salts, surfactants, acids, proppant particulates, diverting agents, filtration agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional shale inhibitors, $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids for a particular application.

Often, the drilling fluid, or drilling fluid composition can include a modified starch and a bridging agent including a calcium carbonate, a magnesium carbonate, a magnesium oxide, a manganese tetroxide, an ilmenite, or a combination thereof having a first particle distribution range. Typically, drilling occurs in the non-production zone of the formation. The drilling can continue to a production zone of the subterranean formation. At this point, a drill-in fluid may be used having the particle size distribution of the bridging agent, such as calcium carbonate, altered by substituting a calcium carbonate having a second particle size distribution (PSD) different from the first particle size distribution of the previous calcium carbonate (e.g., a drill-in fluid having a bimodal PSD of bridging agent particulate such as calcium carbonate). The bridging agent, such as calcium carbonate, can be substituted during drilling by a bridging agent having a different particle size distribution. This change can be conducted in response to one or more formation parameters or one or more aqueous drilling fluid parameters. The one or more formation parameters can include a well depth, a formation porosity, a formation pore throat size, a formation pressure, a formation temperature, or a combination thereof. The one or more aqueous drilling fluid parameters can include a fluid rheology, a top brine separation after static aging, a low temperature and low pressure (LTLP) fluid loss, a high temperature and high pressure (HTHP) fluid loss, a permeability plugging apparatus fluid loss, or a combination thereof.

In some embodiments, a fluid, such as the drilling fluid, can, if possible, be based on the combination of a modified starch, optionally serving as at least one of a viscosifier and a fluid loss agent, and a sized calcium carbonate, optionally serving as a bridging agent.

Modified starches can be those derived from natural starches by chemical reaction of a natural starch with a suitable organic reactant. Examples of suitable modified starches include, but are not limited to, a carboxymethyl starch, a hydroxyethyl starch, a hydroxypropyl starch, an acetate starch, a sulfamate starch, a phosphate starch, a nitrogen modified starch, a starch crosslinked with one or more crosslinking agents or multi-functional agents with at least one aldehyde, epichlorohydrin, borate, phosphate, ether, and a combination thereof, and a starch grafted with at least one acrylonitrile, acrylamide, acrylic acid, methacrylic acid, maleic anhydride, styrene, and a combination thereof. In some embodiments, the modified starch, such as a modified starch ether or ester, can be reacted, e.g., carboxymethylated, crosslinked, hydroxypropylated, acetylated, ethylated, phosphated, sulfated, graft derived, methylated, or a combination thereof, with various chemical agents. Exemplary modified starch ethers and esters include carboxymethylated starch, hydroxypropylated starch, and hydroxypropylated carboxymethyl crosslinked starch. In an embodiment, the starch can be present in the drilling fluid in an amount effective to provide sufficient rheology. Effective amounts may be determined by one of ordinary skill in the art.

A bridging agent can include, but are not limited to, a calcium carbonate, a sized marble, a magnesium oxide, a magnesium carbonate, an iron carbonate, an ilmenite, a hematite, a manganese tetroxide, a sized sodium chloride, a sized potassium chloride, or a combination thereof, and any suitable hydrate or combinations thereof. Generally, the bridging agent particle size may range from about 1 micron to about 600 microns but may vary from formation to formation. Alternatively, the bridging agent particle sizes may range from about 1 micron to about 100 microns, from about 3 microns to about 50 microns, from about 5 microns to about 40 microns, from about 5 microns to about 30 microns, or from about 5 microns to about 25 microns. The particle size used may be determined by the pore throat size of the formation. In some embodiments, the bridging agent can include calcium carbonate optionally including a silica such as quartz. In some embodiments, the predetermined particle size can be a $d_{50}$ particle size of about 1.0 μm to about 150 μm, a $d_{50}$ particle size of about 2.0 μm to about 150 μm, a $d_{50}$ particle size of about 2.0 μm to about 100 μm, a $d_{50}$ particle size of about 3.0 μm to about 80 μm, a $d_{50}$ particle size of about 4.0 μm to about 50 μm, a $d_{50}$ particle size of about 5.0 μm to about 30 μm, or the predetermined particle size is a $d_{50}$ particle size of about 7.0 μm to about 25 μm.

In some embodiments, drilling fluids can include a guar gum, a xanthan gum, a rhamnan, a diutan gum, a welan gum, a scleroglucan gum, or a combination thereof. In some embodiments, the drilling fluid can include an aqueous fluid, as discussed above. Generally, the aqueous fluid may be from any source, provided that it does not contain an amount of components that may undesirably affect the other components in the drilling fluid, as discussed above. In some aspects, the aqueous fluid includes a brine. In one or more aspects, the brine includes monovalent or divalent salts such as, without limitation, at least one salt selected from the group including sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, potassium acetate, sodium acetate, and combinations thereof. A formulated brine may be produced by dissolving one or more soluble salts in water, a natural brine, or sea water.

The brine can be a saturated or an unsaturated brine. The salt may be present in the brine in any amount to form a saturated solution or supersaturated solution. For example, the salt may be included in an amount of about 1% to about 70% by weight of the brine. Alternatively, about 1% to about 5% by weight, about 5% to about 10% by weight, about 10% to about 15% by weight, about 15% to about 20% by weight, about 20% to about 25% by weight, about 25% to about 30% by weight, about 30% to about 35% by weight, about 35% to about 40% by weight, about 40% to about 45% by weight, about 45% to about 50% by weight, or about 10% to about 30% by weight. The brine can reduce dilution and/or volume of the drilling fluid, thus reduces waste volumes.

The aqueous fluid can be present in the drilling fluid in an amount effective to provide a pumpable slurry, such as a slurry having desired (e.g., job or service specific) rheological properties. In aspects, the aqueous fluid is present in the drilling fluid in an amount of from about 50 vol. % to about 99 vol. % based on the total volume of the drilling fluid, alternatively from about 50 vol. % to about 95 vol. %, or alternatively from about 50 vol. % to about 90 vol. %.

In some embodiments, the drilling fluid may optionally include a viscosifier. The viscosifier can include a biopolymer, a polysaccharide, particularly a guar gum, a welan gum, a scleroglucan gum, a rhamnan, a xanthan gum and/or a diutan gum, a synthetic polymer, one or more minerals, or a combination thereof. The minerals can include sepiolite, attapulgite, bentonite, sodium bentonite, montmorillonite, beidellite, nontronite, hectorite, samonite, smectite, kaolinite, serpentine, illite, chlorite, montmorillonite, saponite, fuller's earth, attapulgite, laponite, or combinations thereof. In some embodiments, the viscosifier includes an additional hydroxyethyl cellulose, a hydroxy-propyl guar, a carboxymethyl-hydroxy-propyl guar, one or more modified polysaccharides, a partially hydrolyzed polyacrylamide (PHPA), a carboxy-methylcellulose, a polyanionic cellulose, a guar gum, a locust bean gum, a Karaya gum, a gum tragacanth, one or more hydrophobically modified guars, one or more high-molecular weight polysaccharides composed of mannose and galactose sugars, one or more heteropolysaccharides obtained by the fermentation of starch-derived sugars, xanthan, rhamnan, one or more pectins, diutan, welan, gellan, scleroglucan, chitosan, dextran, one or more substituted or unsubstituted galactomannans, a starch, a cellulose, one or more cellulose ethers, one or more carboxycelluloses, a hydroxypropyl cellulose, one or more carboxyalkylhydroxyethyl celluloses, a carboxymethyl hydroxyethyl cellulose, a methyl cellulose, a sodium polyacrylate, a polyacrylamide, a partially hydrolyzed polyacrylamide, a polymethacrylamide, a poly(acrylamido-2-methyl-propane sulfonate), a poly(sodium-2-acrylamide-3-propylsulfonate), one or more copolymers of acrylamide and acrylamido-2-methyl-propane sulfonate, one or more terpolymers of acrylamido-2-methyl-propane sulfonate, an acrylamide and vinylpyrrolidone or itaconic acid, sepiolite, attapulgite, or combinations thereof.

In some embodiments, the viscosifier is in the drilling fluid in an amount of from about 0.001 weight percent (wt. %) to about 3 wt. %, based on the total weight of the drilling fluid, alternatively from about 0.01 wt. % to about 2.5 wt. %, or alternatively from about 0.1 wt. % to about 2.0 wt. %.

In some embodiments, the drilling fluid may further include one or more additives. The one or more additives can include a penetration rate enhancer, a spotting fluid, a sweeping agent, a deflocculant, a degreaser, a buffer, such as a pH buffer including, e.g., magnesium oxide, a wetting agent, a lubricant, another shale inhibitor, a friction reducer, a strength-stabilizing agent, an emulsifier, an expansion agent, a salt, a fluid loss agent, a vitrified shale, a thixotropic agent, a dispersing agent, a weight reducing additive (e.g., one or more hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, one or more latex emulsions, a formation conditioning agent, one or more elastomers, at least one of a gas and fluid absorbing material, one or more resins, one or more superabsorbers, one or more mechanical property modifying additives (i.e. one or more carbon fibers, one or more glass fibers, one or more metal fibers, one or more mineral fibers, one or more polymeric elastomers, one or more latexes, etc.), one or more inert particulates, an additional biopolymer, a polymer, a fumed silica, a fluid control additive, one or more particulate materials, one or more acids, one or more bases, one or more mutual solvents, one or more corrosion inhibitors, one or more breaking agents, one or more relative permeability modifiers, a lime, one or more clay control agents, one or more fluid loss control additives, one or more flocculants, one or more water softeners, one or more foaming agents, one or more oxidation inhibitors, one or more thinners, one or more scavengers, one or more gas scavengers, one or more lubricants, one or more bridging agents, a foam stabilizer, one or more catalysts, one or more dispersants, one or more breakers, an emulsion thinner, an emulsion thickener, a pH control additive, one or more lost circulation additives, one or more buffers, one or more stabilizers, such as amines and quaternary amines for inhibiting shale hydration swelling, one or more chelating agents, one or more oxidizers, a clay, one or more reducers, a consolidating agent, a complexing agent, a sequestration agent, a control agent, an oxidative breaker, and the like, or combinations thereof. The oxidative breaker can include a bromate, a persulfate, a perborate, and a perbromate, for example. With the benefit of this disclosure, one of ordinary skill in the art should be able to recognize and select one or more suitable optional additives for use in the drilling fluid.

In some embodiments, the one or more additives are present in the drilling fluid in an amount of from about 0.001 wt. % to about 50 wt. %, based on the total weight of the drilling fluid, alternatively from about 0.1 wt. % to about 50 wt. %, or alternatively from about 1 wt. % to about 40 wt. %.

In some embodiments, the drilling fluid can have any suitable pH. As an example, the pH of the drilling can be from about 7 to about 13, about 8 to about 12, or even about 8.5 to about 10.5.

Viscosity of the drilling fluid can be determined by any suitable method. As an example, viscosity of aqueous solutions can be determined by Test Method No. 1300 by of SE Tylose GmbH & Co. KG, part of Shin-Etsu Chemical Co., Ltd. of Tokyo, Japan with a viscometer sold under the trade designation Brookfield rotation viscometer, model LV, of AMETEK Brookfield, Inc. of Middleboro, MA with a thermostatic bath at 25° C. The Brookfield rotation viscometer can have a high-speed balance (resolution 0.01 gram (g)), a laboratory stirrer up to about 200 revolutions per minute (rpm), a 800 milliliter (ml) low-form beaker, a 600 ml high-form beaker, an anchor stirrer about 55 millimeter (mm) wide and about 60 mm high. The concentration of the solution to be measured is adapted to the viscosity grade of the product tested:

TABLE 2

MEASURED SOLUTION CONCENTRATION

| Grade | Concentration | Initial Weight |
|---|---|---|
| <=20 megaPascal second (mPa s) | 5.0% dry basis | 20.0 gram (g) |
| 40-10,000 mPa s | 2.0% dry basis | 10.0 g |
| >=15,000 mPa s | 1.0% dry basis | 5.0 g |
| Tylose HX/HQ | 1.0% dry basis | 5.0 g |

The symbol "<=" means less than or equal to and the symbol ">=" means greater than or equal to.

For determining viscosity, a given amount of the tested substance is weighed on a high-speed balance and introduced in a slow trickle into a tared (including stirrer) 800 ml beaker together with about 450 ml of deionized water with vigorous stirring to disperse the substance. The rate of stirring is now reduced to 100 rpm maximum in order to avoid introducing air in the solution of increasing viscosity. If the product is a retarded type, the pH of the solution is adjusted after 5 to 10 minutes by the addition of 0.5% ammonia to 8 plus or minus 0.2 using the pH meter. The solution is placed in a thermostatic bath at 25° C. for the entire two hour stirring period.

After stirring for one hour, enough deionized water is added to the beaker to give the final weight FW (taking moisture into account) which may be calculated from the following formula:

$$FW=(IW \times (100-M))/C$$

IW=initial weight;
M=% moisture (test method 1130); and
C=chosen concentration of the solution.

The solution is then stirred for a further one hour in the thermostatic bath at 25° C. The procedure can be changed for methylcellulose powder grades. The substance is introduced with stirring into the tared (including stirrer) 800 ml beaker together with about 450 ml of hot water at a minimum of 80° C. and dispersed. The rate of stirring is reduced to 100 rpm maximum. The method of measuring the homogeneous solution can include withdrawing the solution from the thermostatic bath, pouring into a 600 ml beaker and then measuring the viscosity once on the Brookfield LV viscometer with a guard leg. The spindle which has at least 10 scale divisions, is chosen according to the viscosity, and is immersed to the mark in the solution to be measured. The viscosity in mPas is obtained by multiplying the read information on the scale by the corresponding factor for the spindle number and speed of revolution. The spindle number, rate of revolution of the spindle and multiplying factor for the various viscosity grades are shown in the below in TABLE 3:

TABLE 3

| Viscosity Grade | Spindle Number | RPM | Factor |
|---|---|---|---|
| 10 | 1 | 30 | 2 |
| 15/20 | 2 | 60 | 5 |
| 40 | 1 | 30 | 2 |
| 200/250 | 2 | 60 | 5 |
| 300 | 2 | 30 | 10 |
| 1,000 | 3 | 30 | 40 |
| 4,000-10,000 | 4 | 60 | 100 |
| 15,000-60,000 | 3 | 30 | 40 |
| >=100,000 | 4 | 30 | 200 |
| Tylose HX 6000 YG4 (Plus/HT) | 1 | 6 | 10 |
| Tylose HX 500T | 3 | 6 | 200 |
| Tylose HQ 6000 YG4 Plus | 2 | 6 | 50 |

In some embodiments, the treatment fluid, such as the drilling fluid, can be subjected to a shale-particle erosion or disintegration by a hot-rolling test as described in the American Petroleum Institute (API), recommended practice 131, ninth edition, December 2020, Section 16 at page 59. Such a test can determine shale retention or recovery percent of a subjected shale sample. Additionally, a viscometer sold under the trade designation FANN® model 45 APV can be used to measure rheological properties. The procedure for measuring plastic viscosity, yield point, and ten second gel can be in accordance with API 13B-1.

Several different mechanisms may inhibit shale in subterranean formations. Although not wanting to be bound by theory, the mechanisms include but not limited to inhibiting through charge interaction (e.g., using salts and amine based additives), blocking of pores in the formation matrix using inert materials (e.g., using nanomaterials) to prevent aqueous fluids from contacting shales in the formation, and/or at least partially encapsulating shale particles in order to at least partially stabilize shale particles and/or preventing their attrition and/or abrasion into smaller particles. In some embodiments, the methods and compositions may provide a biodegradable shale inhibitor that acts as a shale encapsulator. In some embodiments, the shale encapsulator may form a porous barrier or other structure around the outer surface of a shale particulate that may aid in holding the shale particle together and/or reducing its attrition, abrasion, and/or degradation into smaller particles.

The treatment fluids may be prepared using any suitable method and/or equipment (e.g., blenders, mixers, stirrers, etc.) known in the art at any time prior to their use. The treatment fluids may be prepared at least in part at a well site or at an offsite location. In certain embodiments, the shale inhibitors, e.g., biopolymer and polyamine, and/or other components of the treatment fluid may be metered directly into a base treatment fluid to form a treatment fluid. In certain embodiments, the base fluid may be mixed with the shale inhibitors and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids may be prepared, either in whole or in part, at an offsite location and transported to the site where the treatment or operation is conducted. In introducing a treatment fluid into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation.

In some embodiments, methods for using the treatment fluids can conduct a variety of subterranean treatments, including but not limited to, hydraulic fracturing treatments, acidizing treatments, and drilling operations. In some embodiments, the treatment fluid such as a drilling fluid may be introduced into at least a portion of a wellbore as it is drilled to penetrate at least a portion of a subterranean formation. The drilling fluid may be circulated in the wellbore during drilling, among other reasons, to cool and/or lubricate a drill bit and/or drill pipe to prevent them from sticking to the walls of the wellbore, prevent blowouts by serving as a hydrostatic head to counteract the sudden entrance into the wellbore of high pressure formation fluids, suspend or remove formation cuttings from the wellbore, and/or enhance the stability of the wellbore during drilling.

The treatment fluid, such as a drilling fluid, as disclosed herein, can be used to carry out a variety of subterranean treatments during such operations as drilling, cementing, and/or treating a well for hydrocarbon production, such as oil production.

In some embodiments, the drilling fluid can be placed (e.g., pumped) into a wellbore, during drilling operations. A method of servicing a wellbore penetrating a subterranean formation can include providing a drilling fluid of the type disclosed herein and circulating the drilling fluid from a surface (e.g., a well site) through a wellbore. The drilling fluid can be circulated back to the surface. In one or more aspects, the method further includes extending the wellbore in the subterranean formation while circulating the drilling fluid. The drilling fluid may be circulated through a drill string and bottom hole assembly. The drilling fluid may transfer kinetic energy into a mud motor to drive a drill bit on the end of the bottom hole assembly thereby extending the wellbore.

In some embodiments, the wellbore has a Bottomhole Static Temperature (BHST) of from about 50° F. (about 10° C.) to about 450° F. (about 232° C.), from about 50° F. (about 10° C.) to about 350° F. (about 177° C.), from about 50° F. (about 10° C.) to about 325° F. (about 163° C.), from about 50° F. (about 10° C.) to about 300° F. (about 149° C.), from about 50° F. (about 10° C.) to about 275° F. (about 135° C.), or from about 50° F. (about 10° C.) to about 250° F. (about 121° C.).

As further described in FIG. 1 below, the drilling fluid may be generally cleaned and reused throughout a drilling operation. The drilling fluid may be cleaned of solids and drill cuttings and recycled back into the drill string. The additional oil or aqueous fluid may be added at any time during the fluid handling process to increase or decrease the density. For example, without limitation, the additional oil or aqueous fluid may be added in an inline mixer, to storage tanks including the drilling fluid, in the mud pit, or any other point in the fluid handling system.

Drilled solids, which become entrained in the fluid, may be removed by various means, which are well known in the art. Shale shakers with select screen mesh sizes can often be the most widely-used separation tools. These can be augmented with hydrocyclones of varying size and/or centrifuges having varying spool and bowl sizes and rotational speeds to further remove fine solids. Separation of solids by these means can allow for additional use of a given fluid, with lower requirements for liquid dilution to keep a constant density.

The treatment fluids and shale inhibitors disclosed herein may directly or indirectly affect one or more components or pieces of equipment associated with the preparation, delivery, recapture, recycling, reuse, and/or disposal of the disclosed treatment fluids and shale inhibitors. For example, and with reference to FIG. 1, the disclosed treatment fluids and shale inhibitors may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed biodegradable shale inhibitors may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed shale inhibitors may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed shale inhibitors may be stored, reconditioned, and/or regulated until added to the drilling fluid 122.

As mentioned above, the disclosed shale inhibitors may directly or indirectly affect the components and equipment of the drilling assembly 100. For example, the disclosed shale inhibitors may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used store, monitor, regulate, and/or recondition the shale inhibitors.

The disclosed shale inhibitors may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The disclosed treatment fluids and shale inhibitors may also directly or indirectly affect the mixing hopper 134 and the retention pit 132 and their assorted variations.

The disclosed treatment fluids and/or shale inhibitors may also directly or indirectly affect the various downhole equipment and tools that may come into contact with the treatment fluids and shale inhibitors such as, but not limited to, the drill string 108, any floats, drill collars, mud motors, downhole motors and/or pumps associated with the drill string 108, and any measurement while drilling (MWD) and/or logging while drilling (LWD) tools and related telemetry equipment, sensors or distributed sensors associated with the drill string 108. The disclosed treatment fluids and/or biodegradable shale inhibitors may also directly or indirectly affect any downhole heat exchangers, valves and corresponding actuation devices, tool seals, packers and other wellbore isolation devices or components, and the like associated with the wellbore 116. The disclosed treatment fluids and/or shale inhibitors may also directly or indirectly affect the drill bit 114, which may include, but is not limited to, roller cone bits, polycrystalline diamond compact (PDC) bits, natural diamond bits, any hole openers, reamers, coring bits, etc.

While not specifically illustrated herein, the disclosed treatment fluids and/or shale inhibitors may also directly or indirectly affect any transport or delivery equipment used to convey the treatment fluids and/or shale inhibitors to the drilling assembly 100 such as, for example, any transport vessels, conduits, pipelines, trucks, tubulars, and/or pipes used to fluidically move the treatment fluids and/or shale inhibitors from one location to another, any pumps, compressors, or motors used to drive the treatment fluids and/or shale inhibitors into motion, any valves or related joints used to regulate the pressure or flow rate of the treatment fluids and/or shale inhibitors, and any sensors (i.e., pressure and temperature), gauges, and/or combinations thereof, and the like.

Some embodiments include a method that includes: providing a treatment fluid including an aqueous base fluid and at least one shale inhibitor; introducing the treatment fluid into at least a portion of a subterranean formation to contact at least a portion of the subterranean formation that comprises shale; and allowing the shale inhibitor to interact with the shale in the subterranean formation to at least partially inhibit the shale.

Some embodiments include a method that includes: drilling at least a portion of a wellbore to penetrate at least a portion of a subterranean formation that comprises shale; circulating a drilling fluid in at least a portion of the wellbore while drilling at least a portion of the wellbore, the drilling fluid including an aqueous base fluid and one or more shale inhibitors; and allowing the one or more shale inhibitors to interact with the shale in the subterranean formation to at least partially inhibit the shale.

Some embodiments include a method that includes: drilling at least a portion of a wellbore to penetrate at least a portion of a subterranean formation that comprises shale; circulating a drilling fluid in at least a portion of the wellbore while drilling at least a portion of the wellbore, the drilling fluid including an aqueous base fluid that includes a brine, and at least one shale inhibitor, and allowing the at least one shale inhibitor to interact with the shale in the subterranean formation to at least partially inhibit the shale.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary drilling fluids. Moreover, the disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors, wherein the motors may be topside or downhole motors, for example, used to drive the drilling fluids into motion, any valves or related joints used to regulate the pressure or flow rate of the drilling fluids, and any sensors, such as pressure sensors or temperature sensors, gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats, such as shoes, collars, or valves, for example, logging tools and related telemetry equipment, actuators, such as electromechanical devices, for example, hydromechanical devices, etc.), sliding sleeves, production sleeves, plugs, screens, filters, flow control devices, such as inflow control devices, autonomous inflow control devices, or outflow control devices, for example, couplings, wherein the couplings may include electro-hydraulic wet connect, dry connect, or inductive coupler, for example, control lines, such as electrical lines, fiber optic lines, or hydraulic lines, for example, surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

The embodiments having been generally described, the following examples are given as particular aspects of the disclosure and to demonstrate the practice and advantages thereof. It is understood that the examples are given by way of illustration and are not intended to limit the specification or the claims in any manner.

Shale encapsulation was tested by a shale erosion test in 8.6 pound per gallon (ppg) KCl brine. Additives were dissolved in 8.6 ppg brine. An amount of 20 gram (g) of 2 to 4 millimeter sized London Clay was added to the fluid. The fluid was then hot-rolled at 176° F. for 16 hours. The fluid was poured over a 2 millimeter sieve and the retained London Clay was collected, dried, and weighed. The remaining weight divided by the original weight is reported as the percent shale recovery, which can be abbreviated with the symbol "%" in the following paragraph, and the symbol used as a prefix before "Shale Recovery" in FIGS. 2-4. The percent shale recovery is the amount of shale recovered as a percent compared to the total amount of shale. The tests were run in a glass jar at 176° F. for 16 hours.

Figure 2:
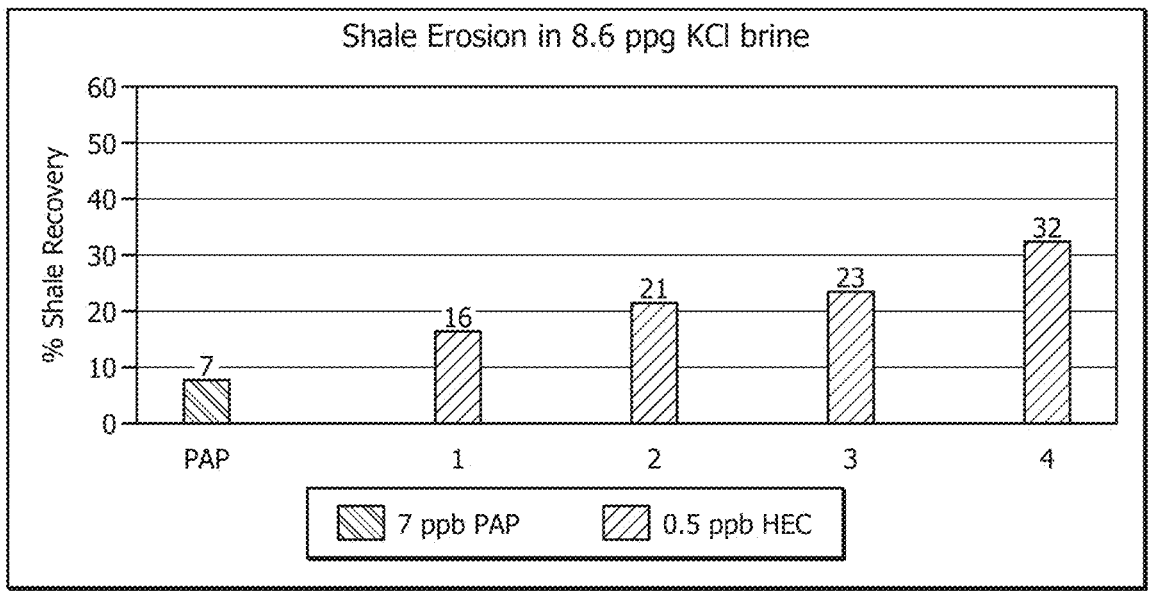
FIG. 2 is a graphical depiction of percent shale recovery of a treatment fluid including hexamethylene diamine (HMD) and a treatment fluid including hydroxyethyl cellulose (HEC) in accordance with some embodiments of the disclosure.
Figure 3:
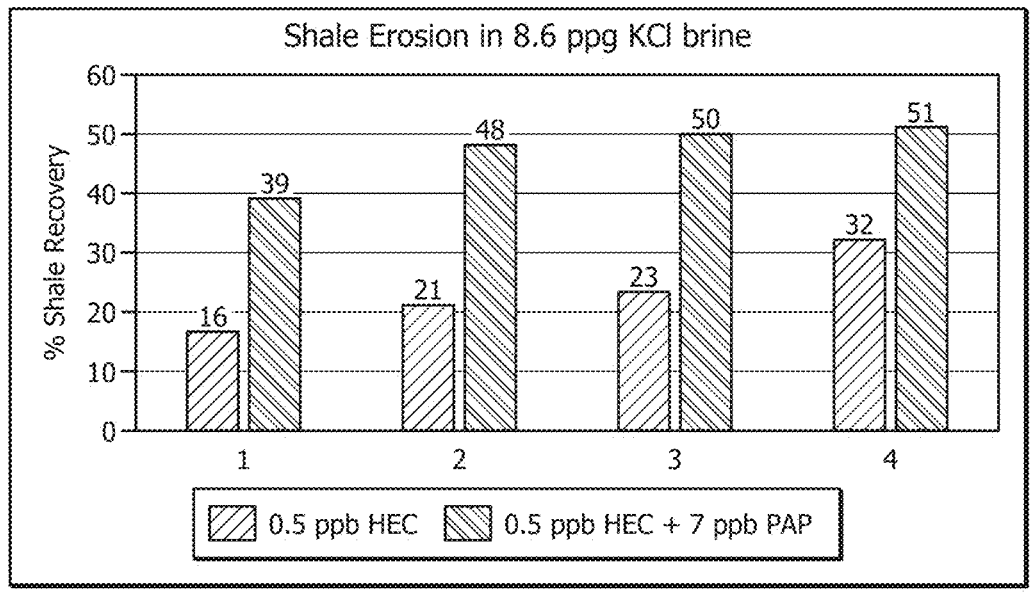
FIG. 3 is a graphical depiction of percent shale recovery of a treatment fluid including HEC and a treatment fluid including HEC and HMD in accordance with some embodiments of the disclosure.
Figure 4:
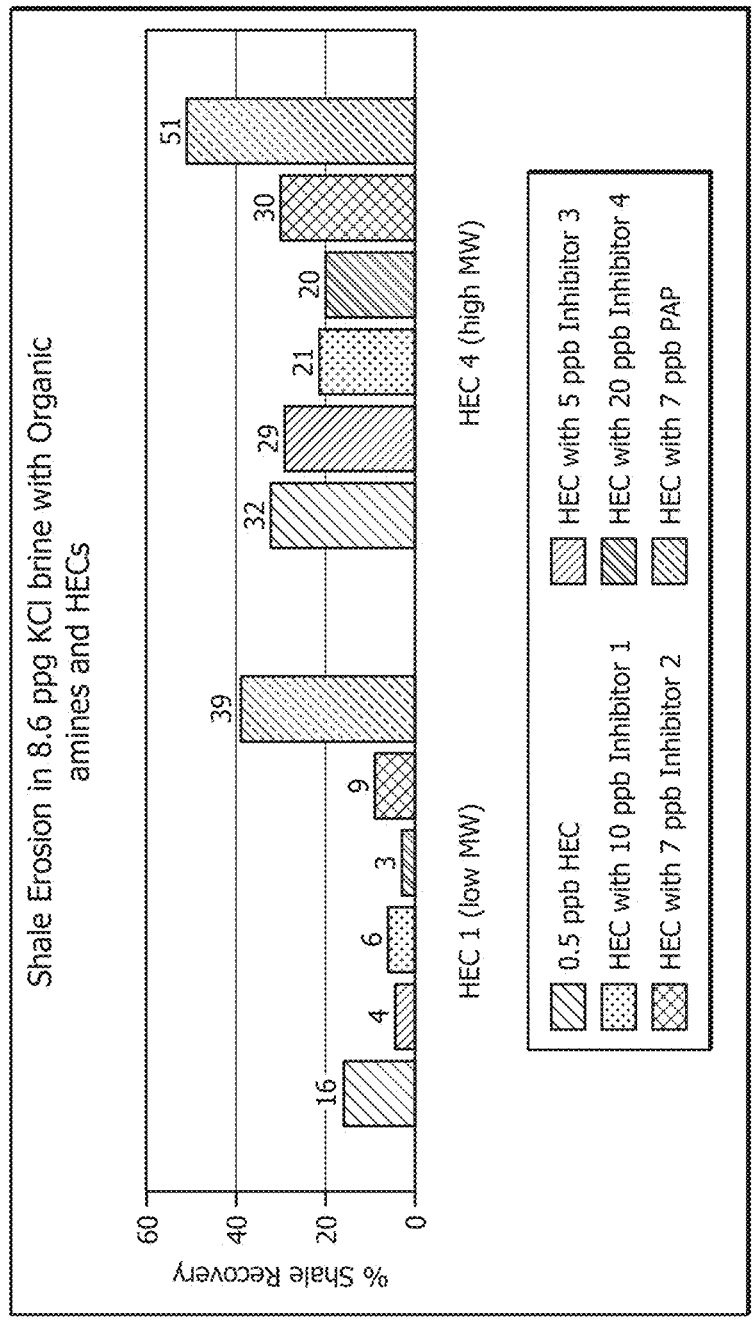
FIG. 4 is a graphical depiction of percent shale recovery of a treatment fluid including HEC, treatment fluids including HEC and an inhibitor, and a treatment fluid including HEC and HMD in accordance with some embodiments of the disclosure.

As shown in FIGS. 2-4, hexamethylene diamine (HMD) is used as a polyamine product (PAP) with about 10% to about 30% active HMD, by weight. The HMD added as a PAP to HEC provides significant and unexpected results with respect to percent shale recovery increasing from 59% to 117% as compared to HEC alone. PAP or its reaction products enhance shale recovery of a lower molecular weight HEC from 16% to 39%, which is a 144% ((39−16)/16) improvement, as depicted in FIG. 4. A higher molecular weight (MW) HEC (HEC 4) increases shale recovery from 32 to 51%, as compared to a 59% ((51−32)/32) improvement for a lower molecular weight HEC (HEC 1). Using PAP alone, only 7% shale recovery was achieved with 7 pounds per barrel (ppb HMD, as depicted in FIG. 2. As shown in FIG. 4, other organic amines (Inhibitors 1-4) showed no effect on HEC in shale encapsulation. Benefits are shown in HEC 1 through 4 with increasing molecular weight, which is significant and unexpected, for improving percent shale recovery. Moreover, shale recovery with HEC goes up as the MW of HEC increases, but HEC combined with PAP demonstrates that even the lower MW of HEC shows greater synergy leading to higher shale recovery than with either material separately. This is yet another significant and unexpected result and gives overall better fluid properties because low MW HEC has less impact on fluid viscosity.

The following are non-limiting, specific embodiments in accordance with the present disclosure:

A first embodiment which is a method comprises contacting subterranean shale with a treatment fluid, wherein the treatment fluid comprises (i) a biopolymer, (ii) a polyamine, and (iii) an aqueous base fluid.

A second embodiment which is the method of the first embodiment, wherein the polyamine comprises a diamine, a triamine, a tetraamine, or a combination thereof.

A third embodiment which is the method of the first embodiment or second embodiment, wherein the treatment fluid is placed in a wellbore penetrating a formation comprising the subterranean shale.

A fourth embodiment which is the method of any of the proceeding embodiments, wherein the subterranean shale is comprised in at least one of a wall of the wellbore, a face of the formation, or a combination thereof.

A fifth embodiment which is the method of any of the proceeding embodiments, wherein the shale comprises one or more particles.

A sixth embodiment which is the method of any of the proceeding embodiments, wherein the one or more particles comprises a drilling cutting.

A seventh embodiment which is the method of any of the proceeding embodiments, wherein the treatment fluid (i) inhibits swelling of the shale, (ii) inhibits hydration of the shale, (iii) encapsulates one or more particles of the shale, or (iv) any combination of (i)-(iii).

An eighth embodiment which is the method of any of the proceeding embodiments, wherein the inhibiting comprises forming a film on a face of a wall of a wellbore, a face of a shale formation, or a combination thereof, and encapsulating comprises coating one or more particles of the shale.

A ninth embodiment which is the method of any of the proceeding embodiments, wherein encapsulates further comprises (i) protecting the integrity of the shale particles from degradation and/or (ii) preventing dispersion of the shale particles, and wherein the (i), (ii), or both: (a) facilitate removal of the shale particles from the treatment fluid at the surface (e.g., via a solids screening device such as cuttings/shale shaker), (b) preserve treatment fluid properties such as rheology or density that would be adversely affected by undesired degradation/dispersal of shale particles, or (c) both (a) and (b).

A tenth embodiment which is the method of any of the proceeding embodiments, further comprising contacting the biopolymer and the diamine above ground adjacent a wellsite.

An eleventh embodiment which is the method of any of the proceeding embodiments, further comprising contacting the biopolymer, the diamine, and the aqueous base fluid above ground adjacent a wellsite.

A twelfth embodiment which is the method of any of the proceeding embodiments, further comprising contacting the biopolymer and the diamine downhole.

A thirteenth embodiment which is the method of any of the proceeding embodiments, further comprising contacting the biopolymer, the diamine, and the aqueous base fluid downhole.

A fourteenth embodiment which is the method of any of the proceeding embodiments, wherein the biopolymer comprises a xanthan gum, a rhamnan, a scleroglucan, a welan gum, a gelan gum, a cellulose or any combination thereof.

A fifteenth embodiment which is the method of any of the proceeding embodiments, wherein the biopolymer comprises the cellulose.

A sixteenth embodiment which is the method of any of the proceeding embodiments, wherein the biopolymer comprises a hydroxyethyl cellulose or a carboxymethyl cellulose.

A seventeenth embodiment which is the method of any of the proceeding embodiments, wherein the biopolymer comprises a hydroxyethyl cellulose (HEC).

An eighteenth embodiment which is the method of any of the proceeding embodiments, wherein the hydroxyethyl cellulose imparts a viscosity of equal to or less than about 150,000 cP, about 100,000 cP, about 80,000 cP, about 70,000 cP, about 60,000 cP, about 50,000 cP, about 40,000 cP, about 30,000 cP, about 10,000 cP, about 9,000 cP, about 8,000 cP, about 7,000 cP, or about 6,000 cP to optionally greater than about 1 cP.

A nineteenth embodiment which is the method of any of the proceeding embodiments, wherein the hydroxyethyl cellulose imparts a viscosity equal to or less than about 10,000 cP, about 9,000 cP, about 8,000 cP, about 7,000 cP, or about 6,000 cP to optionally greater than about 1 cP.

A twentieth embodiment which is the method of any of the proceeding embodiments, wherein the hydroxyethyl cellulose has a degree of substitution of ethylene oxide of from about 0.1 to about 3.

A twenty-first embodiment which is the method of any of the proceeding embodiments, wherein the biopolymer is present in the treatment fluid in an amount of about 0.1 pound per barrel of the treatment fluid (lb/bbl) to about 10 lb/bbl, about 0.2 lb/bbl to about 10 lb/bbl, about 0.3 lb/bbl to about 10 lb/bbl, about 0.4 pound per barrel to about 10 lb/bbl, about 0.5 lb/bbl to about 10 lb/bbl, about 1 lb/bbl to about 10 lb/bbl, or about 5 lb/bbl to about 10 lb/bbl of the treatment fluid.

A twenty-second embodiment which is the method of any of the proceeding embodiments, wherein the polyamine comprises a diamine which, in turn, can include hexamethylene diamine (HMD).

A twenty-third embodiment which is the method of any of the proceeding embodiments, wherein the polyamine comprises hexamethylene diamine or a derivative of HMD.

A twenty-fourth embodiment which is the method of any of the proceeding embodiments, wherein the HEC is present in the treatment fluid in an amount of about 0.03 lb HEC:about 1 lb HMD to about 17 lb HEC:about 1 lb HMD; about 0.05 lb HEC:about 1 lb HMD to about 17 lb HEC:about 1 lb HMD; about 0.07 lb HEC:about 1 lb HMD to about 17 lb HEC:about 1 lb HMD; about 0.09 lb HEC:about 1 lb HMD to about 17 lb HEC:about 1 lb HMD; about 0.1 lb HEC:about 1 lb HMD to about 17 lb HEC:about 1 lb HMD; about 0.3 lb HEC:about 1 lb HMD to about 17 lb HEC:about 1 lb HMD; about 0.5 lb HEC:about 1 lb HMD to about 17 lb HEC:about 1 lb HMD; about 0.7 lb HEC:about 1 lb HMD to about 17 lb HEC:about 1 lb HMD; about 0.9 lb HEC:about 1 lb HMD to about 17 lb HEC:about 1 lb HMD; about 1.1 lb HEC:about 1 lb HMD to about 17 lb HEC:about 1 lb HMD; about 1.3 lb HEC:about 1 lb HMD to about 17 lb HEC:about 1 lb HMD; about 1.5 lb HEC:about 1 lb HMD to about 17 lb HEC:about 1 lb HMD; about 1.7 lb HEC:about 1 lb HMD to about 17 lb HEC:about 1 lb HMD; about 3 lb HEC:about 1 lb HMD to about 17 lb HEC:about 1 lb HMD; about 5 lb HEC:about 1 lb HMD to about 17 lb HEC:about 1 lb HMD; about 10 lb HEC:about 1 lb HMD to about 17 lb HEC:about 1 lb HMD; or about 15 lb HEC:about 1 lb HMD to about 17 lb HEC:about 1 lb HMD.

A twenty-fifth embodiment which is the method of any of the proceeding embodiments, wherein the HEC is present in the treatment fluid in an amount of about 0.3 lb HEC:about 1 lb HMD to about 1.7 lb HEC:about 1 lb HMD; about 0.4 lb HEC:about 1 lb HMD to about 1.7 lb HEC:about 1 lb HMD; about 0.5 lb HEC:about 1 lb HMD to about 1.7 lb HEC:about 1 lb HMD; about 0.6 lb HEC:about 1 lb HMD to about 1.7 lb HEC:about 1 lb HMD; about 0.7 lb HEC:about 1 lb HMD to about 1.7 lb HEC:about 1 lb HMD; about 0.8 lb HEC:about 1 lb HMD to about 1.7 lb HEC:about 1 lb HMD; about 0.9 lb HEC:about 1 lb HMD to about 1.7 lb HEC:about 1 lb HMD; about 1.0 lb HEC:about 1 lb HMD to about 1.7 lb HEC:about 1 lb HMD; about 1.1 lb HEC:about 1 lb HMD to about 1.7 lb HEC:about 1 lb HMD; about 1.2 lb HEC:about 1 lb HMD to about 1.7 lb HEC:about 1 lb HMD; about 1.3 lb HEC:about 1 lb HMD to about 1.7 lb HEC:about 1 lb HMD; about 1.4 lb HEC:about 1 lb HMD to about 1.7 lb HEC:about 1 lb HMD; about 1.5 lb HEC:about 1 lb HMD to about 1.7 lb HEC:about 1 lb HMD; or about 1.6 lb HEC:about 1 lb HMD to about 1.7 lb HEC:about 1 lb HMD.

A twenty-sixth embodiment which is the method of any of the proceeding embodiments, wherein the hexamethylene diamine is protonated.

A twenty-seventh embodiment which is the method of any of the proceeding embodiments, wherein the aqueous base fluid comprises fresh water, salt water, brine, a produced water, a surface water, or a combination thereof.

A twenty-eighth embodiment which is the method of any of the proceeding embodiments, wherein the aqueous base fluid comprises a brine.

A twenty-ninth embodiment which is the method of any of the proceeding embodiments, wherein the brine comprises a salt of sodium chloride, potassium chloride, potassium formate, potassium carbonate, calcium chloride, calcium bromide, cesium formate, zinc bromide, or any combination thereof.

A thirtieth embodiment which is the method of any of the proceeding embodiments, further comprising separately adding the diamine and the biopolymer to the aqueous base fluid.

A thirty-first embodiment which is the method of any of the proceeding embodiments, further comprising adding the diamine and the biopolymer together prior to adding to the aqueous base fluid.

A thirty-second embodiment which is the method of any of the proceeding embodiments, placing the treatment fluid into a wellbore comprises circulating the treatment fluid in at least a portion of the wellbore during drilling thereof.

A thirty-third embodiment which is the method of any of the proceeding embodiments, wherein the treatment fluid comprises a drilling fluid.

A thirty-fourth embodiment which is the method of any of the proceeding embodiments, wherein the treatment fluid increases a recovery of one or more drill cuttings by about 15%, about 18%, about 20%, about 25%, about 30%, about 35%, about 36%, about 37%, about 38%, or about 39% as compared to a treatment fluid absent the diamine.

A thirty-fifth embodiment which is the method of any of the proceeding embodiments, wherein one or more shale particles are comprised in one or more drill cuttings encapsulated by the treatment fluid.

A thirty-sixth embodiment which is a method comprises contacting (i) a biopolymer, (ii) a diamine, and (iii) an aqueous base fluid to form a treatment fluid; and placing the treatment fluid into a wellbore penetrating a subterranean shale formation.

A thirty-seventh embodiment which is a method comprises contacting subterranean shale with a treatment fluid, wherein the treatment fluid comprises (i) a biopolymer, (ii) hexamethylene diamine, and (iii) an aqueous base fluid.

A thirty-eighth embodiment which is the method of thirty-seventh embodiment, wherein the treatment fluid inhibits the one or more shale particles.

A thirty-ninth embodiment which is the method of thirty-seventh embodiment or thirty-eighth embodiment, wherein the biopolymer comprises a xanthan gum, a rhamnan, a scleroglucan, a welan gum, a gelan gum, a cellulose or any combination thereof.

A fortieth embodiment which is a method of thirty-ninth embodiment, wherein the biopolymer comprises the cellulose.

A forty-first embodiment which is the method of any of the thirty-seventh embodiment to fortieth embodiment, wherein the biopolymer comprises a hydroxyethyl cellulose or a carboxymethyl cellulose.

A forty-second embodiment which is the method of any of the thirty-seventh embodiment to forty-first embodiment, wherein the biopolymer comprises a hydroxyethyl cellulose.

A forty-third embodiment which is the method of any of the thirty-seventh embodiment to forty-second embodiment, wherein the biopolymer is present in the treatment fluid in an amount of about 0.1 pound per barrel of the treatment fluid (lb/bbl) to about 10 lb/bbl, about 0.2 lb/bbl to about 10 lb/bbl, about 0.3 lb/bbl to about 10 lb/bbl, about 0.4 pound per barrel to about 10 lb/bbl, about 0.5 lb/bbl to about 10 lb/bbl, about 1 lb/bbl to about 10 lb/bbl, or about 5 lb/bbl to about 10 lb/bbl of the treatment fluid.

A forty-fourth embodiment which is the method of any of the thirty-seventh embodiment to forty-third embodiment, further comprising separately adding the hexamethylene diamine and the biopolymer to the aqueous base fluid.

A forty-fifth embodiment which is the method of any of the thirty-seventh embodiment to forty-fourth embodiment, wherein the hydroxyethyl cellulose imparts a viscosity of equal to or less than about 150,000 cP, about 100,000 cP, about 80,000 cP, about 70,000 cP, about 60,000 cP, about 50,000 cP, about 40,000 cP, about 30,000 cP, about 10,000 cP, about 9,000 cP, about 8,000 cP, about 7,000 cP, or about 6,000 cP to optionally greater than about 1 cP.

A forty-sixth embodiment which is the method of any of the thirty-seventh embodiment to forty-fifth embodiment, wherein the hydroxyethyl cellulose imparts a viscosity to equal to or less than about 10,000 cP, about 9,000 cP, about 8,000 cP, about 7,000 cP, or about 6,000 cP to optionally greater than about 1 cP.

A forty-seventh embodiment which is the method of any of the thirty-seventh embodiment to forty-sixth embodiment, wherein the aqueous base fluid comprises a brine.

A forty-eighth embodiment which is the method of any of the thirty-seventh embodiment to forty-seventh embodiment, wherein the brine comprises a salt of sodium chloride, potassium chloride, potassium formate, potassium carbonate, calcium chloride, calcium bromide, cesium formate, zinc bromide, or any combination thereof.

A forty-ninth embodiment which is the method of any of the thirty-seventh embodiment to forty-eighth embodiment, further comprising placing the treatment fluid into a wellbore comprises circulating the treatment fluid in at least a portion of the wellbore during drilling thereof.

A fiftieth embodiment which is the method of any of the thirty-seventh embodiment to forty-ninth embodiment, wherein one or more shale particles are comprised in one or more drill cuttings encapsulated by the treatment fluid.

A fifty-first embodiment which is the method of any of the thirty-seventh embodiment to fiftieth embodiment, wherein the treatment fluid comprises a drilling fluid.

A fifty-second embodiment which is the method of any of the forty-second embodiment to fifty-first embodiment, wherein the hydroxyethyl cellulose has a degree of substitution of ethylene oxide of from about 0.1 to about 3.

A fifty-third embodiment which is the method of any of the thirty-seventh embodiment to fifty-second embodiment, wherein the hexamethylene diamine is protonated.

A fifty-fourth embodiment which is the method of any of the thirty-seventh embodiment to fifty-third embodiment, wherein the treatment fluid increases a recovery of the one or more drill cuttings by about 15%, about 18%, about 20%, about 25%, about 30%, about 35%, about 36%, about 37%, about 38%, or about 39%.

A fifty-fifth embodiment which is a treatment fluid composition, comprises (i) a biopolymer, (ii) a hexamethylene diamine (HMD), and (iii) an aqueous base fluid.

A fifty-sixth embodiment which is the treatment fluid composition of the fifty-fifth embodiment, wherein the biopolymer comprises a hydroxyethyl cellulose (HEC).

A fifty-seventh embodiment which is the treatment fluid composition of the fifty-fifth embodiment or fifty-sixth embodiment, wherein the biopolymer is present in the treatment fluid in an amount of about 0.1 pound per barrel of the treatment fluid (lb/bbl) to about 10 lb/bbl, about 0.2 Lb/bbl to about 10 lb/bbl, about 0.3 lb/bbl to about 10 lb/bbl, about 0.4 pound per barrel to about 10 Lb/bbl, about 0.5 lb/bbl to about 10 lb/bbl, about 1 lb/bbl to about 10 lb/bbl, or about 5 lb/bbl to about 10 lb/bbl of the treatment fluid.

A fifty-eighth embodiment which is the treatment fluid composition of any of the fifty-fifth embodiment to fifty-seventh embodiment, wherein the HEC is present in the treatment fluid in an amount of about 0.03 lb HEC:about 1 lb HMD to about 17 lb HEC:about 1 lb HMD; about 0.05 lb HEC:about 1 lb HMD to about 17 lb HEC:about 1 lb HMD; about 0.07 lb HEC:about 1 lb HMD to about 17 lb HEC:about 1 lb HMD; about 0.09 lb HEC:about 1 lb HMD to about 17 lb HEC:about 1 lb HMD; about 0.1 lb HEC:about 1 lb HMD to about 17 lb HEC:about 1 lb HMD; about 0.3 lb HEC:about 1 lb HMD to about 17 lb HEC:about 1 lb HMD; about 0.5 lb HEC:about 1 lb HMD to about 17 lb HEC:about 1 lb HMD; about 0.7 lb HEC:about 1 lb HMD to about 17 lb HEC:about 1 lb HMD; about 0.9 lb HEC:about 1 lb HMD to about 17 lb HEC:about 1 lb HMD; about 1.1 lb HEC:about 1 lb HMD to about 17 lb HEC:about 1 lb HMD; about 1.3 lb HEC:about 1 lb HMD to about 17 lb HEC:about 1 lb HMD; about 1.5 lb HEC:about 1 lb HMD to about 17 lb HEC:about 1 lb HMD; about 1.7 lb HEC:about 1 lb HMD to about 17 lb HEC:about 1 lb HMD; about 3 lb HEC:about 1 lb HMD to about 17 lb HEC:about 1 lb HMD; about 5 lb HEC:about 1 lb HMD to about 17 lb HEC:about 1 lb HMD; about 10 lb HEC:about 1 lb HMD to about 17 lb HEC:about 1 lb HMD; or about 15 lb HEC:about 1 lb HMD to about 17 lb HEC:about 1 lb HMD.

A fifty-ninth embodiment which is the treatment fluid composition of any of the fifty-fifth embodiment to fifty-eighth embodiment, wherein the HEC is present in the treatment fluid in an amount of about 0.3 lb HEC:about 1 lb HMD to about 1.7 lb HEC:about 1 lb HMD; about 0.4 lb HEC:about 1 lb HMD to about 1.7 lb HEC:about 1 lb HMD; about 0.5 lb HEC:about 1 lb HMD to about 1.7 lb HEC:

about 1 lb HMD; about 0.6 lb HEC:about 1 lb HMD to about 1.7 lb HEC:about 1 lb HMD; about 0.7 lb HEC:about 1 lb HMD to about 1.7 lb HEC:about 1 lb HMD; about 0.8 lb HEC:about 1 lb HMD to about 1.7 lb HEC:about 1 lb HMD; about 0.9 lb HEC:about 1 lb HMD to about 1.7 lb HEC: about 1 lb HMD; about 1.0 lb HEC:about 1 lb HMD to about 1.7 lb HEC:about 1 lb HMD; about 1.1 lb HEC:about 1 lb HMD to about 1.7 lb HEC:about 1 lb HMD; about 1.2 lb HEC:about 1 lb HMD to about 1.7 lb HEC:about 1 lb HMD; about 1.3 lb HEC:about 1 lb HMD to about 1.7 lb HEC: about 1 lb HMD; about 1.4 lb HEC:about 1 lb HMD to about 1.7 lb HEC:about 1 lb HMD; about 1.5 lb HEC:about 1 lb HMD to about 1.7 lb HEC:about 1 lb HMD; or about 1.6 lb HEC:about 1 lb HMD to about 1.7 lb HEC:about 1 lb HMD.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
    contacting subterranean shale with a treatment fluid,
    wherein the treatment fluid comprises (i) a biopolymer comprising a hydroxyethyl cellulose (HEC), (ii) a polyamine comprising a hexamethylene diamine (HMD), and (iii) an aqueous base fluid, and
    wherein the treatment fluid comprising the HEC and HMD increases a recovery of one or more drill cuttings by at least about 15% as compared to a treatment fluid comprising the HEC and absent the HMD.

2. The method of claim 1, wherein the treatment fluid is placed in a wellbore penetrating a formation comprising the subterranean shale.

3. The method of claim 2, wherein the subterranean shale is comprised in at least one of a wall of the wellbore, a face of the formation, or a combination thereof.

4. The method of claim 1, wherein the subterranean shale comprises one or more shale particles.

5. The method of claim 4, wherein the one or more shale particles comprises a drilling cutting.

6. The method of claim 1, wherein the treatment fluid (i) inhibits swelling of the subterranean shale, (ii) inhibits hydration of the subterranean shale, (iii) encapsulates one or more shale particles, or (iv) any combination of (i)-(iii).

7. The method of claim 6, wherein inhibiting comprises forming a film on a face of a wall of a wellbore, a face of a shale formation, or a combination thereof, and encapsulating comprises coating the one or more shale particles.

8. The method of claim 6 wherein encapsulates further comprises (i) protecting an integrity of the one or more shale particles from degradation and/or (ii) preventing dispersion of the one or more shale particles, and wherein the (i) protecting, the (ii) preventing, or both:
    (a) facilitate removal of the one or more shale particles from the treatment fluid at the surface,
    (b) preserve treatment fluid properties comprising rheology or density that would be adversely affected by undesired degradation/dispersal of the one or more shale particles, or
    (c) both (a) and (b).

9. The method of claim 1, further comprising contacting the biopolymer, the polyamine, and the aqueous base fluid downhole.

10. The method of claim 1, wherein the HEC imparts a viscosity of equal to or less than about 150,000 cP to optionally greater than about 1 cP.

11. The method of claim 1, wherein the hydroxyethyl cellulose HEC has a degree of substitution of ethylene oxide of from about 0.1 to about 3.

12. The method of claim 1, wherein the biopolymer is present in the treatment fluid in an amount of about 0.1 pound per barrel (lb/bbl) to about 10 lb/bbl of the treatment fluid.

13. The method of claim 1, wherein the HEC is present in the treatment fluid in an amount of about 0.03 lb HEC:about 1 lb HMD to about 17 lb HEC:about 1 lb HMD.

14. The method of claim 1, further comprising placing the treatment fluid into a wellbore comprises circulating the treatment fluid in at least a portion of the wellbore during drilling thereof.

15. The method of claim 1, wherein the treatment fluid comprising the HEC and HMD increases the recovery of the one or more drill cuttings about 15% to about 39% as compared to the treatment fluid comprising the HEC and absent the HMD.

16. A method comprising:
    contacting (i) a biopolymer comprising a hydroxyethyl cellulose (HEC), (ii) a diamine comprising a hexamethylene diamine (HMD), and (iii) an aqueous base fluid to form a treatment fluid; and
    placing the treatment fluid into a wellbore penetrating a subterranean shale formation,
    wherein the treatment fluid comprising the HEC and HMD increases a recovery of one or more drill cuttings by at least about 15% as compared to a treatment fluid comprising the HEC and absent the HMD.

17. The method of claim 16, wherein the treatment fluid comprising the HEC and HMD increases the recovery of the one or more drill cuttings about 15% to about 39% as compared to the treatment fluid comprising the HEC and absent the HMD.

18. The method of claim 16, wherein a subterranean shale comprises one or more shale particles.

19. The method of claim 18, wherein the one or more shale particles comprises a drilling cutting.

20. The method of claim 18, wherein the treatment fluid (i) inhibits swelling of the subterranean shale, (ii) inhibits hydration of the subterranean shale, (iii) encapsulates one or more shale particles, or (iv) any combination of (i)-(iii).

21. The method of claim 20, wherein inhibiting comprises forming a film on a face of a wall of the wellbore, a face of a shale formation, or a combination thereof, and encapsulating comprises coating the one or more shale particles.

* * * * *